(12) United States Patent
Doyle

(10) Patent No.: US 6,381,696 B1
(45) Date of Patent: Apr. 30, 2002

(54) METHOD AND SYSTEM FOR TRANSIENT KEY DIGITAL TIME STAMPS

(75) Inventor: Michael D. Doyle, Wheaton, IL (US)

(73) Assignee: Proofspace, Inc., Chicago, IL (US)

( * ) Notice: Subject to any disclaimer, the term of this patent is extended or adjusted under 35 U.S.C. 154(b) by 0 days.

(21) Appl. No.: 09/158,592

(22) Filed: Sep. 22, 1998

(51) Int. Cl.[7] ................................................. G06F 1/24
(52) U.S. Cl. ........................ 713/156; 713/158; 713/161; 713/168
(58) Field of Search ................................. 713/156, 158, 713/161, 168, 169, 171, 175, 176, 178, 180

(56) References Cited

U.S. PATENT DOCUMENTS

| 5,001,752 A | 3/1991 | Fischer |
| 5,136,647 A | 8/1992 | Haber et al. |
| 5,201,000 A | 4/1993 | Matyas et al. |
| RE34,954 E | 5/1995 | Haber et al. |
| 5,469,507 A | 11/1995 | Canetti et al. |
| 5,673,316 A | 9/1997 | Auerbach et al. |
| 5,787,172 A | 7/1998 | Arnold |
| 5,864,667 A * | 1/1999 | Barkan ........................ 713/201 |

OTHER PUBLICATIONS

Very Sign Digital ID Center FAQS, Sep. 8, 1998.
Digital Signature Trust Company Resources, 1997.
RSA Cryptology Today FAQ (3/3); Sep. 30, 1993.

* cited by examiner

Primary Examiner—Thomas R. Peeso
(74) Attorney, Agent, or Firm—Townsend and Townsend and Crew, LLP

(57) ABSTRACT

Irrefutable public key digital signature time-stamps are created and used based upon, for example, the concept of transient time-interval-related secret cryptographic keys, which are used to digitally sign submitted data during specific time intervals, and then are permanently destroyed. The public-key correlate for each time interval is saved for future authentication of the content of time-stamped data and time of creation of time-stamped data. The validity of the public keys is ensured through the certification of each time interval's public key using the previous time interval's secret key, immediately before that secret key is destroyed.

60 Claims, 4 Drawing Sheets

METHOD AND SYSTEM FOR TRANSIENT KEY DIGITAL TIME STAMPS

FIELD OF THE INVENTION

The present invention relates to a method for digital time stamping data. More particularly, the present invention relates to the digital time stamping of data, without the need for subsequent third party verification, by the chaining of key pairs, the key pairs being generated for particular time intervals.

BACKGROUND INFORMATION

The concept of chain of evidence has long been a fundamental tenet of the U.S. judicial system. Many legal situations depend upon the ability to prove that a certain piece of evidence existed at a certain point in time and that it has not been subsequently altered. In the past, when most of the possible types of evidence consisted of material objects, there was a need for a protocol of a "chain of witnesses" to testify to the veracity of an evidentiary object in question. Historically, if the evidence was under the control of only a finite set of individuals, and if all of those individuals could testify as to the location and state of the object, then the court would accept the claim of authenticity of the evidence.

Of course, such a system is dependent upon the availability of trustworthy witnesses that will be available and willing to testify in any given circumstance. Often times, witnesses are available, but not trustworthy, or vice versa. This is particularly the case with respect to document authentication, where the details of when a specific document was created or signed is in question. Clearly, a system was needed to allow one to easily obtain a "witness on demand" in many situations.

This concept of evidentiary authentication is so important to so many areas of endeavor, that a formalized system of professional document witnesses was developed, for example, called the Notary Public service. Notary Publics would, for a fee, attest to such things as the existence of a document and the identity of the document holder or signer. Of course a notary could not swear to any knowledge of the actual contents of a document, since that would have required that the notary keep copies, in perpetuity, of every document ever witnessed —an impractical requirement. Much of the trust held in the notary public system related to a generally-held belief that it was impossible or impractical to forge a notary public's stamp and signature, or to buy a notary public's testimony. As computer graphics and desktop publishing technology advances, however, the level of difficulty of creating forged documents and signatures decreases significantly. A result of this technological advance is the fact that some states, such as California, no longer accept notarization as absolute proof of document validity.

As more and more of the information of import in personal and business transactions becomes digital in form, the usefulness of notary-public-style authentication mechanisms decreases. Much of this information is stored, accessed and managed through computer database management systems. All major database systems permit time stamping of data in records. Many commercial and governmental systems depend upon the assumption of veracity of such database time stamps. The presumption is that, if the organization is trustworthy, then the time stamps in their databases can be believed. In practice, this assertion requires a large degree of, to borrow a literary term, "willing suspension of disbelief." No one, of course, can safely assume that all individuals within a large organization are trustworthy, even if the organization, itself, is believed to be so. Furthermore, it is now well known that no conventional computer database system is immune from the possibility of data tampering or "hacking" by dishonest individuals.

One approach that has been developed to deal with some of this problem is based upon a technology called "public key" cryptography. One of the most well known of this type of system is the program called Pretty Good Privacy, distributed by the Massachusetts Institute of Technology, which makes use of the Rivest-Shamir-Adleman (RSA) public key cryptosystem. Such systems are built around the concept of encrypting data in such a way that allows both secure transmission and authentication of sensitive data. Public key systems employ a pair of cryptographic keys for each encryption/decryption event. One key is kept secret by the owner (e.g., the private key), and the other key is publicly distributed (e.g., the public key). A message encrypted with one of the keys in a key pair can only be decrypted with the other key, and vice versa.

This system allows, for example, the encryption of data by one individual, using a second individual's public key,. The message could then be sent to a second individual over unsecure channels, and only the second individual could access the unencrypted data, since it could only be decrypted with the second individual's private key.

Prior to using the second individual's public key to encrypt the data, the first individual could have used his or her private key to encrypt the data, thereby digitally "signing" the data. The recipient could then use the sender's public key to decrypt it, thus proving that it actually came from the sender, since only the sender could have used the correct secret key to sign the data. Such a system provides both confidentiality of data and a mechanism for authentication of the identity of the sender. It also proves that the data could not have been altered in any way since the time it was encrypted by the sender. Public keys, themselves, can be "certified" by signing them with a trusted individual's secret key (e.g., a digital signature). Others can then assess the authenticity of published public keys by authenticating them using that trusted individual's public key. If that trusted individual later loses faith in the validity of the certified key, then he can issue a so-called revocation certificate, signed by the trusted individual's private key, that notifies others that the previously-certified public key is no longer to be trusted in the future.

Public key algorithms are notoriously slow. For this reason, virtually all public key digital signature systems use what is called a "cryptographically-strong one-way hash function" to create what is called a "message digest" from the data to be signed. This message digest is a unique representation of that data, sort of a data fingerprint, that is typically much smaller than the original data. For example, the message digests that PGP uses are only 128 bits in length. The message digest is then encrypted using the sender's secret key before sending the data to the recipient. The recipient can then use the sender's public key to automatically decrypt the message digest and then verify that it does indeed match the original data. This is a very secure system, since it is computationally infeasible for an attacker to devise a substitute message that would provide an identical message digest. Most estimates state that it would take $10^{12}$ or more years (taking into account Gordon Moore's "law" relating to increases in chip capacity over time) to successfully fake a 128-bit message digest using the algorithm employs by the PGP software package. Also, changing even a single byte of a digested message would cause the hash function to be unable to match the message digest to the unencrypted data.

Public key digital signatures, therefore, can irrefutably prove that signed data was originally signed by a given secret key and that the data has not changed in any way since the signature was made. Systems such as PGP routinely attach time-stamps to both key pairs at their creation, and to digital signatures, each time they are created. Such time-stamps, however, are dependent only upon the internal clocks within the computers being used, and thus are subject to inaccuracies or falsification by, for example, an individual intentionally changing the time on a computer's clock in order to make it falsely appear that a given digital signature was created at a specific point in time.

For this reason, a new type of notary public has arisen, which uses public-key digital signatures to notarize, for a fee, digital information typically submitted over the Internet. These so-called "digital notaries" are, essentially, businesses that provide such a service and agree to attest to the veracity of both the content of the original data, as well as the time at which the signature was made. This is a major improvement over the notary public concept of old, since the new digital notary services can testify to the fact that data which has been digitally signed by their service existed at a certain point in time, and that it hasn't been altered in any way since that point in time. The largest problem with such digital notary services, and also a motivating reason for the method according to the present invention, is the fact that the authenticity of such digital-notary-generated digital signatures is wholly dependent upon the trustworthiness of the institution and individuals running the digital notary service.

To solve this problem, a system is needed that will automatically and rigorously prove the veracity of digital signature time-stamps, without depending upon the trustworthiness of the institution or individuals administering a digital notary service. Transient-key digital time-stamps according to an embodiment of the present invention provide these capabilities.

SUMMARY OF THE INVENTION

According to an embodiment of the present invention, irrefutable public key digital signature time-stamps are created and used. The system is based upon, for example, the concept of transient time-interval-related secret cryptographic keys, which are used to digitally sign submitted data during specific time intervals, and then are permanently destroyed. The public-key correlate for each time interval is saved for future authentication of the content of time-stamped data and time of creation of time-stamped data. The validity of the public keys is ensured through the certification (e.g., signing) of each time interval's public key using the previous time interval's secret key, immediately before that secret key is destroyed.

DETAILED DESCRIPTION OF THE INVENTION

The digital time stamping method according to an embodiment of the present invention provides a mechanism to irrefutably prove that a collection of data existed at a given interval of time and has not changed since that interval of time. A significant advantage of the present invention is that it provides non-repudiation to the user. It is difficult to deny the veracity of the time-stamp certificates generated by the method according to an embodiment of the present invention. For example, the system does not depend upon the trustworthiness (or later existence) of any external "certification authority" or any external time tracking system. Rather, all that is needed to authenticate the time stamp generated according to an embodiment of the present invention is, for example, the time-stamped data, the signature from the time-stamp certificate, the time interval's public key from the time-stamp certificate, and a standard public-key authentication program, such as either the free or commercial version of PGP. Other public key encryption programs such as the J/CRYPTO Professional Cryptography Classes for Java Developers (http://www.baltimore.ie/products/jcrypto/index.html) could also be used with the present invention. Moreover, the method according to an embodiment of the present invention will work with any kind of computer data.

Systems utilizing the method for transient-key digital time stamps according to the present invention can be set up as, for example, Internet servers, stamping all requests on a fee-for-service basis. The time of creation and the internal state of information can be proven without endangering the confidentiality of sensitive data. The time stamping method according to an embodiment of the present invention makes the method suitable for use in, for example, invention documentation systems. Accordingly, the method according to an embodiment of the present invention can also be used to authenticate critical confidential records, such as medical records and financial transactions, can be easily adapted to any computing platform, and is not dependent upon any specific public-key algorithm.

Figure 1:
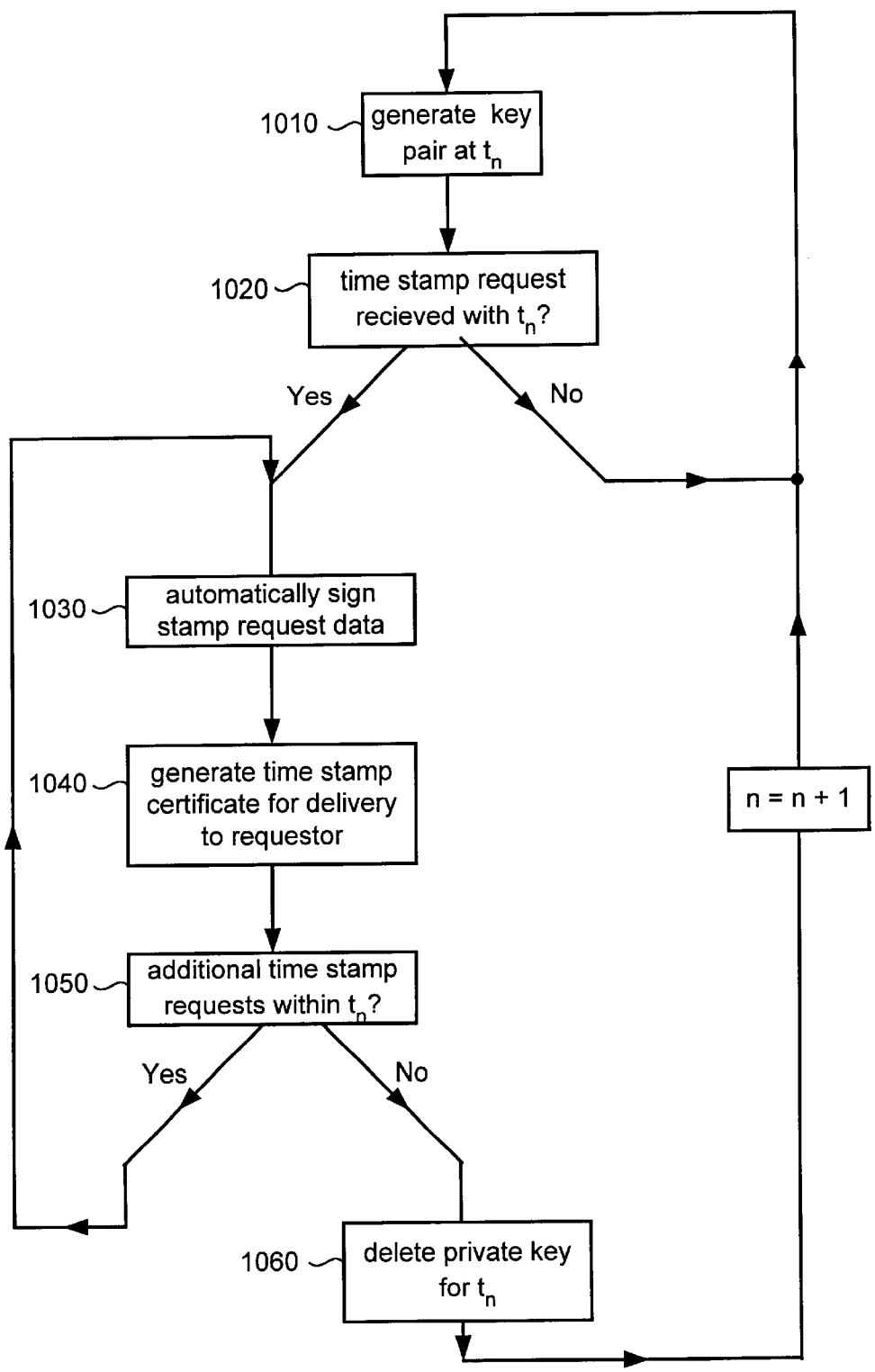
FIG. 1 illustrates an exemplary flowchart for a method for digital time stamping according to an embodiment of the present invention.

FIG. 1 illustrates an exemplary flowchart for a digital time stamping method according to an embodiment of the present invention. In step 1010 a key pair is generated at time interval $t_n$. As is known in the art, the key pair includes a public key and a private key. The time interval can be any defined period, e.g., every second, 10 seconds, minute or 10 minutes. The current time interval is referred to as $t_n$. In step 1020, it is determined if a time stamp request is received during time interval $t_n$. If no time stamp request is received during time interval $t_n$, then the process returns to step 1010 to generate a new key pair for the next time interval, n being incremented by 1 to indicate the next time interval.

If a time stamp request is received during time interval $t_n$, in step 1030 the data accompanying the time stamp request is automatically signed. For example, a conventional message digest for the data could be generated that would be automatically encrypted using the private key of time interval $t_n$. As a result of signing the data, the signature of the time stamp can only be decrypted using the public key of time interval $t_n$. In step 1040, a time stamp certificate is generated for delivery to the requester indicating the temporal existence of the data. In step 1050, it is determined if additional time stamp requests are received within time interval $t_n$.

If no additional time stamp requests are received, then the private key for time interval $t_n$ is deleted in step 1060 and the process returns to step 1010 to generate a key pair for the next time interval, n being incremented by 1. If further time stamp requests are received during time interval $t_n$, then the process returns to step 1030 to process each further time stamp request. As indicated in step 1060, the private key for time interval $t_n$ is deleted at the end of the time interval and the public key would be, for example, archived for subsequent use to decrypt the time stamp. Thus, a separate private key is used to automatically time stamp the data associated with a time stamp request received during each defined time interval according to an embodiment of the present invention.

The process according to an embodiment of the present invention illustrated in FIG. 1 differs from prior art systems in that, for example, the key pairs are automatically generated every defined time interval and the data accompanying the time stamp request is automatically signed using the private key of the time interval that the time stamp request is received, the private key being deleted after the time interval. In contrast, prior art time stamping systems would use a single private key to sign all time stamp requests and employ a separate mechanism, usually based on the computer system implementing the time stamp, to provide the time stamp data. Also unlike the time stamping method according to an embodiment of the present invention, some prior art systems would chain together the message digests for sequentially-submitted documents that have been signed to generate the message digest encrypted for the time stamp, for example, as described in U.S. Pat. No. 5,136,647, which is hereby incorporated by reference.

Figure 2A:
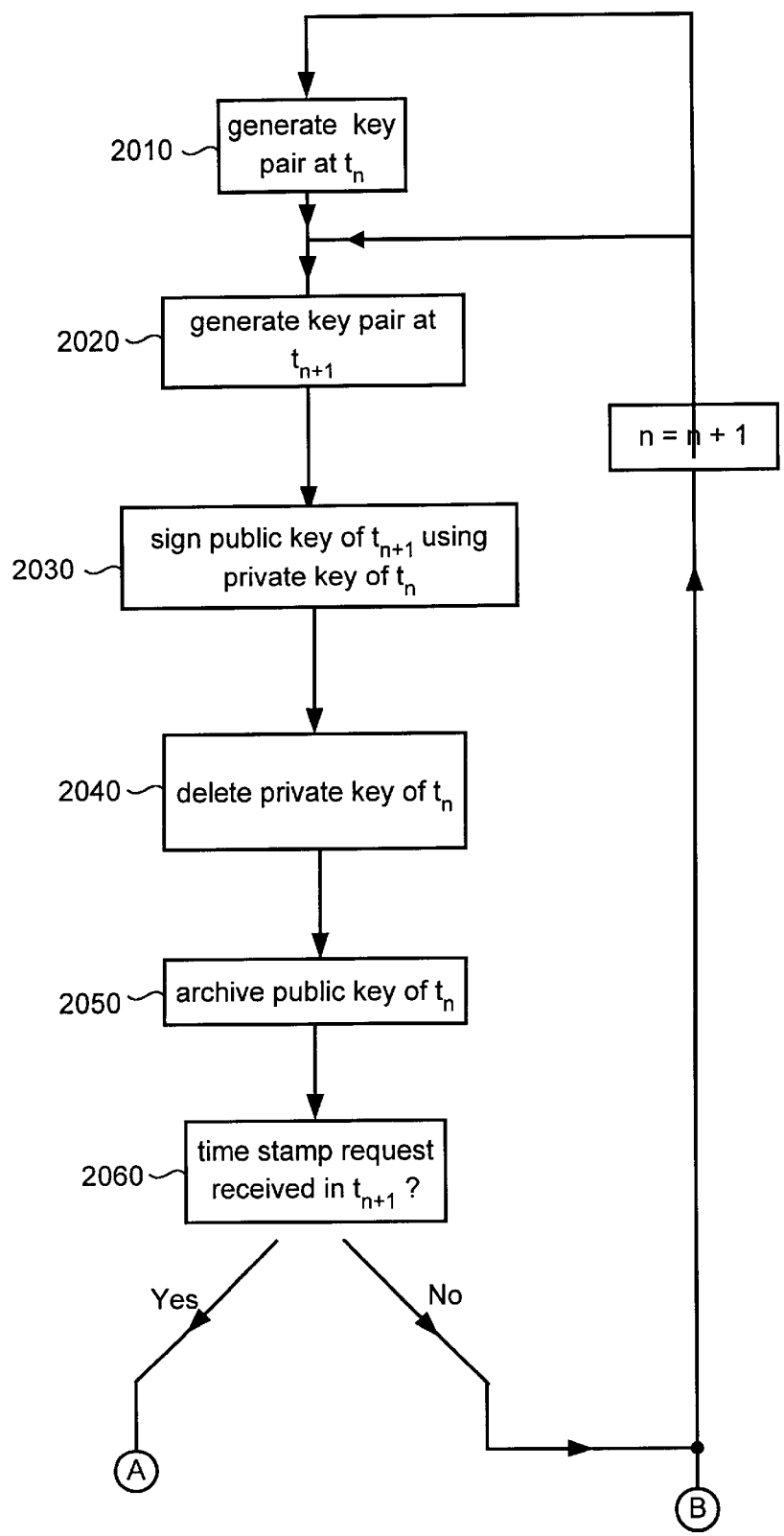
FIG. 2A illustrates a portion of an exemplary flowchart for another method for digital time stamping according to an embodiment of the present invention.

FIG. 2A illustrates an exemplary flowchart for a digital time stamping method according to another embodiment of the present invention. In step 2010 a key pair is generated. As is known in the art, the key pair includes a public key and a private key. According to an embodiment of the present invention, a key pair is generated for each time interval utilized by the system implementing the time stamping method. The implementing system can include, for example, a conventional general purpose computer, such as a microprocessor based personal computer or server. In an embodiment of the present invention, the method is implemented in software that executes on a client-server computer system architecture. The time interval can be any defined period, e.g., every second, 10 seconds, minute or 10 minutes. The current time interval is referred to as $t_n$ and the next time interval is referred to as $t_{n+1}$. For the purposes of time stamping documents, accuracy to the minute may be sufficient for subsequent authentication purposes.

In step 2020, another key pair is generated at time $t_{n+1}$. Like the first key pair, the next key pair also has a public key and a private key. To generate the key pairs in steps 2010 and 2020, a conventional digital time stamping system such as PGP could be modified to automatically generate key pairs every defined time interval. For example, conventional digital time stamping systems are designed for users to generate key pairs, usually via user I/O with the system to input the information necessary to generate a key pair (e.g., a pass phrase and a random seed required by PGP). According to an embodiment of the present invention, the source code for such systems could be modified to generate, for example, a pass phrase and a random seed that would be automatically fed to the key pair generation algorithm for each defined time interval, thereby automatically providing the input normally provided by a user to generate a key pair.

In step 2030, the public key of time interval $t_{n+1}$ is signed using the private key of time interval $t_n$. For example, a conventional message digest for the public key of time interval $t_{n+1}$ could be generated that would be encrypted using the private key of time interval $t_n$. As a result of signing the public key of time interval $t_{n+1}$, the signature of the public key can only be decrypted using the public key of time interval $t_n$. The signing of the public key of time interval $t_{n+1}$ using the private key of time interval $t_n$ could be accomplished, for example, using script based control of existing software, such as the PGP software (e.g., a single command line instructing that one key sign another key). In step 2040, the private key of time interval $t_n$ is deleted. Thus, the private key for time interval $t_n$ exists for the duration of time interval $t_n$ and for the time necessary during time interval $t_{n+1}$ to sign the public key of time interval $t_{n+1}$. In step 2050, the public key for time interval $t_n$ is archived for subsequent use, e.g., to decrypt the time stamp on the public key of time interval $t_{n+1}$.

Figure 2B:
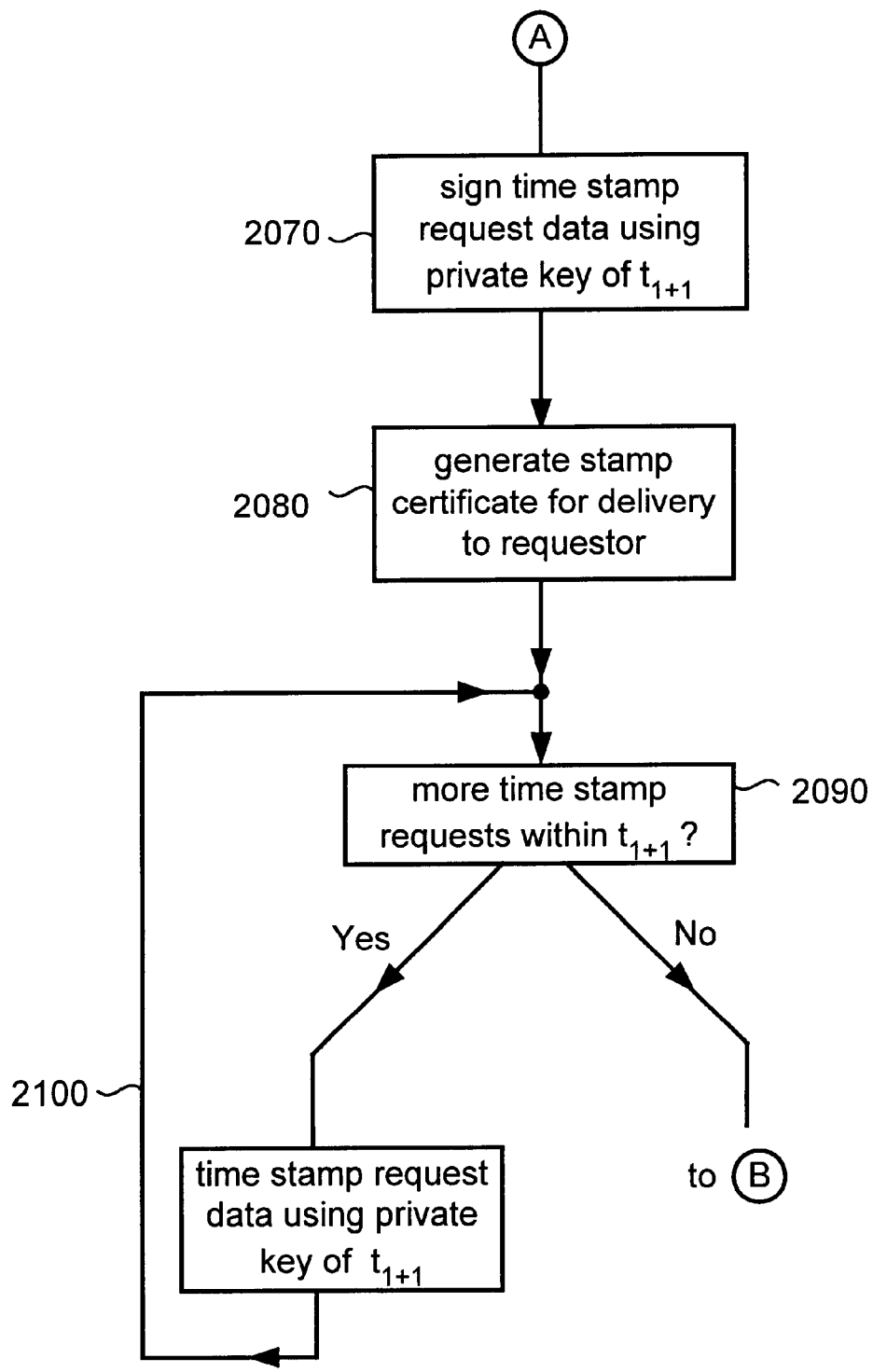
FIG. 2B illustrates another portion of an exemplary flowchart for another method for digital time stamping according to an embodiment of the present invention.

In step 2060, it is determined if a time stamp request is received during time interval $t_{n+1}$. If no time stamp request is received, then the process returns to step 2020 to generate a key pair for the next time interval, n being incremented by 1. If a time stamp request is received during time interval $t_{n+1}$, in step 2070, illustrated in FIG. 2B, the data accompanying the time stamp request is signed using the private key of time interval $t_{n+1}$. For example, as is known in the art, a conventional message digest for the data to be time stamped according to an embodiment of the present invention could be generated that would be encrypted using the private key of time interval $t_{n+1}$. As a result of signing the data using the private key of time interval $t_{n+1}$, the signature of the time stamp could only be decrypted using the public key of time interval $t_{n+1}$, which public key itself has been time stamped according to an embodiment of the present invention and can be authenticated only using the public key of the prior time interval $t_n$ as described above. Therefore, using an embodiment of the method according to the present invention, authentication of the time stamp on data is self-validated as the keys for two time intervals have been chained together.

No independent third party is required to verify that the time stamp on the data is accurate. In another exemplary embodiment, the key pair for $t_{n+1}$ is generated and certified in advance, during the end of the prior time interval $t_n$, to insure that the key pair for time interval $t_{n+1}$ is available immediately at the beginning of $t_{n+1}$.

In step 2080, a stamp certificate is generated for delivery to the requesting party. According to an exemplary embodiment of the present invention, such a stamp certificate includes a digital signature of the submitted data and the certified public keys for time intervals $t_n$ and $t_{n+1}$. In step 2090, it is determined if any additional time stamp requests are received within time interval $t_{n+1}$. If no further time stamp requests are received within time interval $t_{n+1}$, the process returns to point B on FIG. 2A to generate the key pair for the next time interval. If another time stamp request is received during time interval $t_{n+1}$, in step 2100 the data accompanying the time stamp request is signed using the private key of time interval $t_{n+1}$ as described above and the process loops back to step 2090 until no further time stamp requests are received during time interval $t_{n+1}$.

The method according to an embodiment of the present invention for time stamping data can be implemented, for example as software, firmware or hard-wired logic using a suitable general purpose computer. For example, the software implementation of the present invention can be written in the Java programming language, that can run on any platform.

Figure 3A:
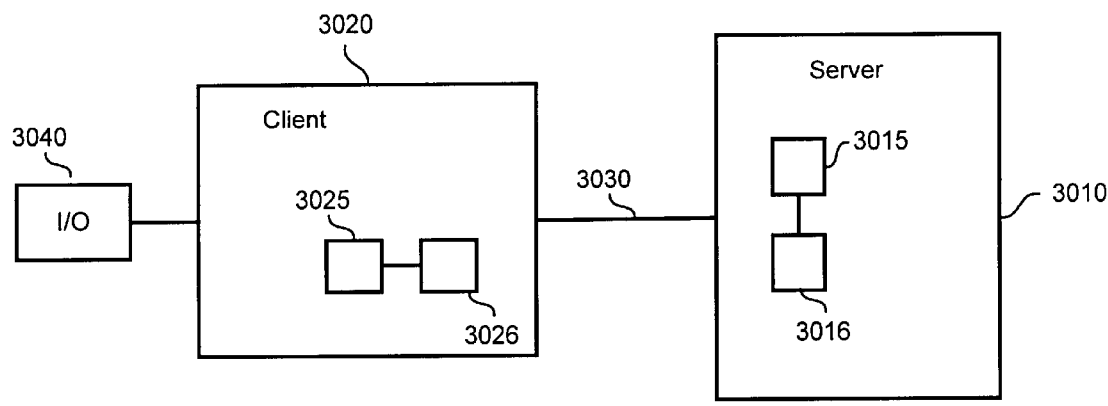
FIG. 3A illustrates a first exemplary embodiment for a time stamping system according to the present invention.

FIG. 3A illustrates an exemplary client-server architecture for implementing the time stamping method according to an embodiment of the present invention. In a client-server architecture, the server portion of time stamping program for an embodiment of the present invention would reside in, for example, a memory 3015 of the server 3010. The time stamping program would execute on the cpu 3016 connected to the memory 3015. The server 3010 is connected to the client 3020 via, for example, a connection 3030, such as a LAN, WAN or Internet connection. The client computer 3020 would include a time stamping client portion of the method according to an embodiment of the present invention residing in a memory 3025, the time stamping client program executing on the cpu 3026 connected to the memory 3025. An I/O device 3040, such as a keyboard or mouse, provides user access to the time stamping method according to an embodiment of the present invention.

In operation, for example, a user would identify data to be time stamped via the I/O device 3040 which would cause the client application program stored in memory 3025, to execute in memory 3026 and generate a message digest for the data, for example in a manner known in the art. The message digest would be transmitted via connection 3030 to server 3010, where the application program stored in memory 3015 would execute in memory 3016 to time stamp the message digest and return a time stamp certificate to client computer 3020 vial connection 3030, for example as described in FIGS. 1 or 2A–2B.

In an alternative implementation of the client-server architecture illustrated in FIG. 3A, the signing could occur at the client computer 3020. For example, via the I/O device 3040, a user could identify data to be time stamped and submit the stamp request to the server computer 3010 via connection 3030 without providing a message digest for the data. In response to the stamp request, the server 3010 would generate a key pair for the current time interval according to an embodiment of the present invention (e.g., with a public key signed by the private key of the prior time interval key pair) and return the key pair for the current time interval, the passphrase for the time interval's private key, and the public key from the prior time interval to the client computer 3020. To ensure the secrecy of the transmission from the server 3010 to the client 3020, the connection 3030 can include, for example, a secure channel using SECURE SOCKETS LAYER (SSL). Once the client 3020 receives the transmission from the server 3010, the client can generate the message digest and sign the message digest of the time stamp request using the private key of the current time interval, for example in a manner as is known in the art. After the time stamp is created, the client-side copies of the associated private key and passphrase are then immediately deleted.

In yet another alternative embodiment of the client-server architecture illustrated in FIG. 3A, the client computer 3020 can generate its own key pair and use a key pair generated by the server 3010 to time stamp the public key of the key pair generated by the client computer 3020. For example, the client computer 3020 would generate a key pair and transmit the public key of the key pair to the server 3010 via connection 3030. The private key of a key pair generated by the server 3010 for the current time interval would be used to sign the public key from the client 3020. The signed public key and the public key of the key pair generated by the server would be transmitted back to the client 3020. The private key from the key pair generated by the client 3020 would be used to time stamp the data. Immediately after the time stamp was produced, the client-side private key would be immediately deleted, then the client-side public key would be revoked by using the server-side private key to issue a revocation certificate for the client-side public key. The private key from the server 3010 would be destroyed. The revocation certificate would be incorporated into the time stamp certificate, together with the signature of the data, the server-side public keys for the current and previous time intervals, and the client-side public key.

Figure 3B:
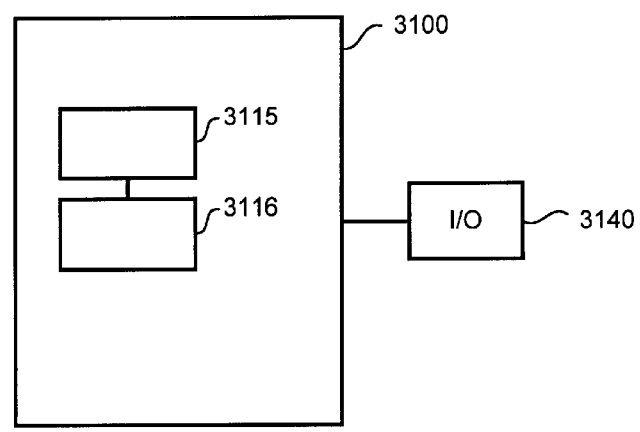
FIG. 3B illustrates a second exemplary embodiment for a time stamping system according to the present invention.
Figure 2B:
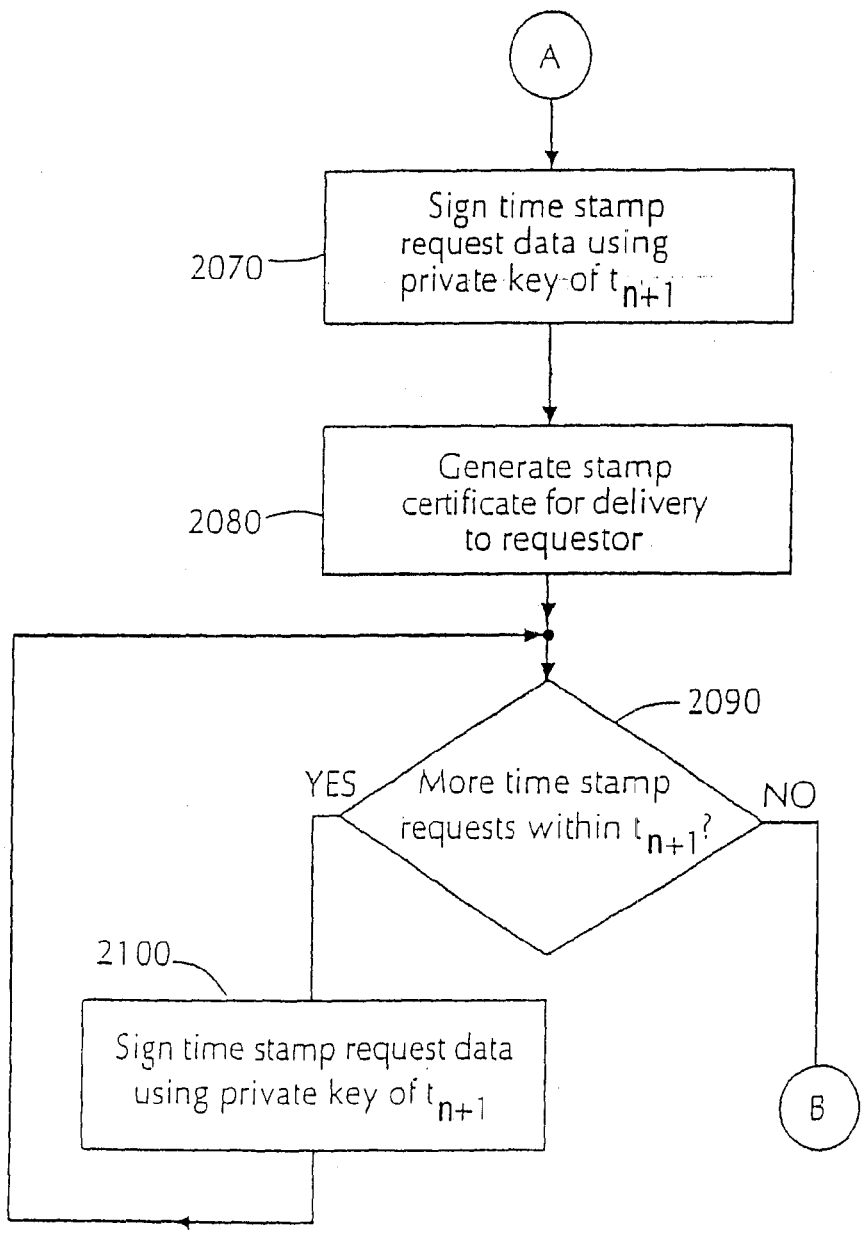

FIG. 3B illustrates an alternative embodiment for a system implementing the time stamping method according to an embodiment of the present invention. In FIG. 3B, the time stamping method is carried out in a single computer system 3100, such as a relational database system or a financial transaction system. Computer system 3100 includes a memory 3115 connected to a cpu 3116. An I/O device 3140, such as a keyboard or mouse, is connected to the computer 3100 and provides user access to the time stamping method according to an embodiment of the present invention. The memory 3115 would contain, for example, both the resident program to generate the message digests for data to be time stamped and the time stamping program according to an embodiment of the present invention.

According to the illustrative embodiment of FIG. 3B, either the user would identify data to be time stamped via the I/O device 3140 or the system would automatically identify data to be time stamped, for example as in response to a database transaction. Identification of the data to be time stamped then would cause the resident program stored in memory 3115 to execute in CPU 3116 and generate a message digest for the data. The message digest would be provided to the application program, also stored in memory 3115, which would execute in CPU 3116 to time stamp the data and return a time stamp certificate to the resident program, which could cause the time stamp certificate to be forwarded to the I/O device 3140 for the user.

Therefore, according to the present invention, key pairs are generated for particular time intervals and time stamp requests are automatically carried out using the private key for the time interval, the private key being destroyed after the time interval. In another embodiment of the present invention, the private key of a prior time interval is used to sign the public key for a subsequent time interval before the private key of the prior time interval is destroyed. In this embodiment of the present invention, every time interval has its own key pair for which the private key is destroyed after signing the public key for the next time interval. According to the present invention, key pairs do not have to be continuously generated every time interval, but can be pre-generated and selected from a queue for each time interval that a time stamp request is received.

The time stamping method according to an embodiment of the present invention uses public key cryptography in a new way to, first, create key pairs that correspond not to fixed entities, such as previous systems employ, but which correspond to transient time intervals; and second, to provide a mechanism to use the keys, and signatures created by those keys, to provide rigorous proof of the time of existence and the authenticity of the content within data signed by the system. As mentioned above, a feature of the system is that the secret key for a given time interval only exists for a finite, typically very short, period of time, and is replaced by subsequent secret keys as subsequent time intervals proceed. A public key cryptography system, such as PGP with the above-described modifications, is employed to automatically generate a series of public-key encryption key pairs at regular time intervals. Each key contains a designation, for example typically within the key's user ID, which identifies the specific time interval during which it is to be (or was) used. For dynamically-created keys, the minimum possible duration of a time interval is limited by the time necessary for creation of a key pair and the use of that key pair to validate a public key. As indicated above, shorter time intervals can be enabled by pre-generating the key pairs.

As illustrated above, the veracity of the time designation is proven by "chaining" of signatures, so that each new time interval's public key is certified (e.g., digitally signed) using the prior interval's secret key, immediately prior to deleting that prior time interval's secret key. This is done, for example, by using the prior time interval's secret key to digitally sign the new time interval's public key. Immediately after the public key is signed, the prior interval's secret key is deleted.

The public key of each key pair is stored for future use. Any given private key is used for time-stamping data only during the time interval immediately following the interval within which the private key was generated. During its interval of use, the secret key is used to digitally sign and time-stamp all data submitted to the system for such processing. As data is submitted to the system for time-stamping, these data are processed by signing them using the respective time interval's private key. This signing process generates a time-stamp certificate. Each time-stamp certificate includes, for example, the digital signature of the data generated by the secret key and the certified public key for the current time interval of use. Each interval-of-use's public key can be also archived for future reference. For use in easy authentication of time-stamp certificates in the future, all time-stamp certificates can he archived as well, although such time-stamp certificate archiving is not necessary for later proof of the veracity of time-stamps generated by the system.

At the end of each time interval, a new key pair is generated, the public key of the new pair is certified (e.g., signed) by the current time interval's secret key, and that secret key is then deleted, and the cycle continues. Validation of a time-stamp at any later point requires using the respective time interval's public key to authenticate the digital signature in the time-stamp certificate. Validation of that public key is accomplished by using the previous time interval's public key to authenticate the certification signature on the public key to be authenticated. The ability to trace back through the "chain" of public key certification signatures-provides irrefutable proof of the location, in time, of any individual time interval's stamp within the chain of signatures. Further evidence of the exact time that a given time interval key was in use can be provided by tracking other certificates that were generated by the same key and collecting evidence of the time of generation of those signatures and the signed data relating to them. Since the secret key for each time interval is destroyed immediately after that time interval passes, it is virtually impossible to create a bogus time-stamp after the fact.

Many other implementations of the time stamping method according to an embodiment of the present invention are possible as well. As described above, for example, one could calculate the message digests at the users' sites, and send only those message digests to the server for signing. This would both insure confidentiality of data and efficient network bandwidth usage.

What is claimed is:

1. A method for certifying data, comprising the steps of:

generating a key pair at a first time interval, the key pair including a private key and a public key;

receiving a certification request;

determining if the certification request was received within the first time interval;

if the certification request was received within the first time interval, automatically responding to the certification request by digitally signing data associated with the certification request using the private key; and deleting the private key.

2. The method according to claim 1, further comprising the step of generating a time stamp certificate confirming the digital signing of the data.

3. The method according to claim 1, further comprising the step of archiving the public key of the first time interval.

4. The method according to claim 1, further comprising the step of authenticating the digitally signed data using the public key.

5. The method according to claim 1, further comprising the step of determining if a further certification request is received during the first time interval.

6. The method according to claim 5, further comprising determining if the further certification request was received within the first time interval; and if the further certification request was received within the first time interval, automatically responding to the further certification request by digitally signing data associated with the further certification request using the private key, wherein the step of deleting the private key is performed after the further certification request has been responded to.

7. The method according to claim 1, further comprising the steps of:

generating a key pair at a next time interval, the key pair including a private key and a public key;

receiving a next certification request;

determining if the next certification request was received within the first time interval;

if the next certification request was received within the next time interval, automatically responding to the next certification request by digitally signing data associated with the next certification request using the private key of the next time interval; and deleting the private key for the next time interval.

8. A method for certifying data, comprising the steps of:

generating a first key pair at a first time interval, the first key pair including a first public key and a first private key;

generating a second key pair at a second time interval, the second key pair including a second public key and a second private key;

signing the second public key using the first private key;

deleting the first private key;

determining if a certification request was received within the second time interval;

if the certification request was received within the second time interval, processing the certification request during the second time interval using the second private key; and deleting the second private key.

9. The method according to claim 8, further comprising the step of archiving the first public key.

10. The method according to claim 8, wherein the step of processing the certification request includes automatically responding to the certification request by digitally signing data associated with the certification request using the second private key.

11. The method according to claim 10, further comprising the step of generating a time stamp certificate confirming the digital signing of the data.

12. The method according to claim 11, wherein the time stamp certificate includes the digital signature and the second public key.

13. The method according to claim 12, wherein the time stamp certificate further includes the first public key.

14. The method according to claim 8, further comprising the step of certifying the digitally signed data using the first public key.

15. A system for certifying data, comprising:
a general purpose computer; and
an I/O device coupled to the general purpose computer, wherein the general purpose computer includes a memory containing a program executable by the general purpose computer, the executable program instructing the general purpose computer to
generate a key pair at a first time interval, the key pair including a private key and a public key,
receive a certification request,
determining if the certification request was received within the first time interval;
if the certification request was received within the first time interval, automatically respond to the certification request by digitally signing data associated with the certification request using the private key, and
delete the private key.

16. The system according to claim 14, wherein the general purpose computer has a client-server architecture including a client computer and a server computer.

17. A system for certifying data, comprising:
a general purpose computer; and
an I/O device coupled to the general purpose computer, wherein the general purpose computer includes a memory containing a program executable by the general purpose computer, the executable program instructing the general purpose computer to
generate a first key pair at a first time interval, the first key pair including a first public key and a first private key,
generate a second key pair at a second time interval, the second key pair including a second public key and a second private key,
sign the second public key using the first private key,
delete the first private key,
determine if a certification request was received within the second time interval;
if the certification request was received within the second time interval, process the certification request during the second time interval using the second private key, and
delete the second private key.

18. The system according to claim 16, wherein the general purpose computer has a client-server architecture including a client computer and a server computer.

19. A computer readable medium having stored instructions for causing a central processing unit to execute the following method:
generating a key pair at a first time interval, the key pair including a private key and a public key;
receiving a certification request;
determining if the certification request was received within the first time interval;
if the certification request was received within the first time interval, automatically responding to said certification request by digitally signing data associated with said certification request using said private key; and
deleting said private key.

20. A computer readable medium having stored instructions for causing a central processing unit to execute the following method:
generating a first key pair at a first time interval, said first key pair including a first public key and a first private key;
generating a second key pair at a second time interval, said second key pair including a second public key and a second private key;
signing said second public key using said first private key;
determining if a certification request was received within the second time interval;
if the certification request was received within the second time interval;
processing the certification request during said second time interval using said second private key; and
deleting said first and second private keys.

21. A system for certifying data comprising:
means for generating a key pair at a first time interval, the key pair including a private key and a public key;
means for receiving a certification request;
means for determining if the certification request was received within the first time interval;
means for automatically responding to said certification request by digitally signing data associated with said certification request using said private key if the certification request was received within the first time interval; and
means for deleting said private key.

22. The system of claim 21, further comprising means for generating a time stamp certificate confirming the digital signing of the data.

23. The system of claim 21, further comprising means for archiving the public key of the first time interval.

24. The system of claim 21, further comprising means for authenticating the digitally signed data using the public key.

25. The system of claim 21, further comprising means for determining if a further certification request is received during the first time interval.

26. The system of claim 25, further comprising means for determining if the further certification request was received within the first time interval; and means for automatically responding to the further certification request by digitally signing data associated with the further certification request using the private key if the further certification request was received within the first time interval, wherein the step of deleting the private key is performed after the further certification request has been processed.

27. The system of claim 21 further comprising:
means for generating a key pair at a next time interval, the key pair including a private key and a public key;
means for receiving a next certification request;
means for determining if the next certification request was received within the next time interval;
means for automatically responding to the next certification request by digitally signing data associated with the next certification request using the private key of the next time interval if the next certification request was received within the next time interval; and
means for deleting the private key for the next time interval.

28. A system for certifying data comprising:
- means for generating a first key pair at a first time interval, said first key pair including a first public key and a first private key;
- means for generating a second key pair at a second time interval, said second key pair including a second public key and a second private key;
- means for signing said second public key using said first private key;
- means for determining if a certification request was received within the second time interval;
- means for processing a certification request during said second time interval using said second private key if the certification request was received within the second time interval; and
- means for deleting said first and second private keys.

29. The system of claim 28, further comprising means for archiving the first public key.

30. The system of claim 28, wherein the means for processing the certification request includes means for automatically responding to the certification request by digitally signing data thereby creating a digital signature associated with the certification request using the second private key.

31. The system of claim 30, further comprising means for generating an time stamp certificate confirming the digital signing of the data.

32. The system of claim 31, wherein the time stamp certificate includes said digital signature and the second public key.

33. The system of claim 32, wherein the time stamp certificate further includes the first public key.

34. The system of claim 30, further comprising means for certifying the digitally signed data using the first public key.

35. A server for certifying data comprising:
- a key generator for generating a first public key and a first private key during a first time interval and a second public key and a second private key during a second time interval;
- reception means for receiving a certification request, said certification request arriving at said reception means during said second time interval;
- determination means coupled to said key generator and said reception means for determining if the certification request was received within the second time interval;
- first signature means coupled to said key generator and said reception means for signing said second public key with said first private key in response to said certification request if the certification request was received within the second time interval; and
- second signature means coupled to said key generator and said reception means for signing data received during said second time interval with said second private key.

36. The server of claim 35, further comprising means for returning said second public key and said signed data to said user.

37. The server of claim 35 further comprising means for deleting said first and second private keys.

38. The server of claim 35, further comprising the step of archiving the first public key.

39. A method for digitally signing data received from a customer comprising the steps of:
- creating a first public key during a first time interval and a second public key during a second time interval;
- signing said second public key with a first private key created during said first time interval;
- receiving a request to certify data from a user;
- determining if the request to certify data was received from the user within the second time interval;
- if the request was to certify data was received from the user within the second time interval, creating a signature using a second private key and said data, said second private key created during said second time interval; and
- returning said second public key and said signature to said user.

40. The method of claim 39 further comprising the step of deleting said first and second private keys.

41. The method of claim 39, further comprising the step of archiving the first and second public keys.

42. A computer readable medium having stored instructions for causing a central processing unit to execute the following method:
- creating a first public key during a first time interval and a second public key and second private key during a second time interval,
- signing said second public key with a first private key created during said first time interval;
- receiving a request to certify data from a user;
- determining if the request to certify data was received within the second time interval;
- if the request was to certify data was received within the second time interval, creating a signature using a second private key and said data, said second private key created during said second time interval; and
- returning said second public key and said signature to said customer.

43. A method for authenticating data comprising the steps of:
- accessing an archive, said archive including a first public key created during a first time interval and a second public key created during a second time interval, wherein said second public key is signed with a first private key created during said first time interval;
- determining if a request to certify data was received within the second time interval;
- if the request was to certify data was received within the second time interval, receiving a certificate, said certificate containing a signature, said signature created using a second private key, said second private key created during said second time interval, said certificate further containing said second public key;
- authenticating said second public key using said first public key; and
- authenticating said signature using said second public key.

44. A computer readable medium having stored instructions for causing a central processing unit to execute the following method:
- accessing an archive, said archive including a first public key created during a first time interval and a second public key created during a second time interval, wherein said second public key is signed with a first private key created during said first time interval;
- determining if the request to certify data was received within the second time interval;
- if the request was to certify data was received within the second time interval, receiving a certificate, said certificate containing a signature, said signature created using a second private key, said second private key created during said second time interval, said certificate further containing said second public key;

authenticating said second public key using said first public key; and authenticating said signature using said second public key.

45. A method for certifying data comprising the steps of:

creating a first public key during a first time interval and a second public key during a second time interval;

signing said second public key with a first private key created during said first time interval;

receiving a request from a customer to certify data;

determining if the request from the customer to certify data was received within the second time interval;

if the request was to certify data was received within the second time interval, creating a signature using a second private key and said data, said second private key created during said second time interval;

returning said second public key and said signature to said customer in a certificate;

storing in an archive said first public and said second public key;

authenticating said second public key using said first public key; and authenticating said signature using said second public key.

46. A computer readable medium having stored instructions for causing a central processing unit to execute the following method:

creating a first public key during a first time interval and a second public key during a second time interval;

signing said second public key with a first private key created during said first time interval;

receiving a request from a customer to certify data;

determining if the request from the customer to certify data was received within the second time interval;

if the request was to certify data was received within the second time interval, creating a signature using a second private key and said data, said second private key created during said second time interval;

returning said second public key and said signature to said customer in a certificate;

storing in an archive said first public and said second public key;

authenticating said second public key using said first public key; and authenticating said signature using said second public key.

47. A system for digitally signing and authenticating data comprising:

means for creating a first public key during a first time interval and a second public key during a second time interval;

means for signing said second public key with a first private key created during said first time interval;

means for receiving a request from a customer to certify data, means for determining if the request to certify data was received within the second time interval;

means for creating a signature using a second private key and said data, said second private key created during said second time interval if the request was to certify data was received within the second time interval;

means for returning said second public key and said signature to said customer in a certificate;

means for storing in an archive said first public and said second public key;

means for authenticating said second public key using said first public key; and means for authenticating said signature using said second public key.

48. A computer program for digitally signing data comprising, in combination:

first code for creating a first public key during a first time interval and a second public key during a second time interval;

second code for signing said second public key with a first private key created during said first time interval;

third code for receiving a request to certify data from a customer;

fourth code for determining if the request from the customer to certify data was received within the second time interval;

fifth code for creating a signature using a second private key and said data, said second private key created during said second time interval if the request was to certify data was received within the second time interval;

sixth code for returning said second public key and said signature to said customer; and a computer-readable storage medium that stores said first, second, third, fourth, and fifth, and sixth codes.

49. A computer program for performing authentication comprising, in combination:

first code for accessing an archive, said archive including a first public key created during a first time interval and a second public key created during a second time interval, wherein said second public key is signed with a first private key created during said first time interval;

second code for determining if a request to certify data was received within the second time interval;

third code for receiving a certificate if the request from to certify data was received within the second time interval, said certificate containing a signature, said signature created using a second private key, said second private key created during said second time interval, said certificate further containing said second public key;

fourth code for authenticating said second public key using said first public key;

fifth code for authenticating said signature using said second public key; and a computer-readable storage medium that stores said first, second, third, fourth and fifth codes.

50. A computer program for digitally signing and authenticating data comprising, in combination:

first code for creating a first public key during a first time interval and a second public key during a second time interval;

second code for signing said second public key with a first private key created during said first time interval;

third code for receiving a request from a customer to certify data from a customer;

fourth code for determining if the request from the customer to certify data was received within the second time interval;

fifth code for creating a signature using a second private key and said data, said second private key created during said second time interval if the request from the customer to certify data was received within the second time interval;

sixth code for returning said second public key and said signature to said customer in a certificate;

seventh code for storing in an archive said first public and said second public key;

eighth code for authenticating said second public key using said first public key;

ninth code for authenticating said signature using said second public key; and a computer-readable storage medium that stores said first, second, third, fourth, fifth, sixth, seventh, eighth, and ninth codes.

51. A machine having a memory that contains data representing public and private keys, said public and private keys generated by the following method:

generating a key pair at a first time interval, the key pair including a private key and a public key;

determining if the certification request was received within the first time interval;

if the certification request was received within the first time interval, automatically responding to a certification request from a customer by digitally signing data associated with said certification request using said private key; and deleting said private key.

52. A machine having a memory that contains data representing public and private keys, said public and private keys generated by the following method:

generating a first key pair at a first time interval, said first key pair including a first public key and a first private key;

generating a second key pair at a second time interval, said second key pair including a second public key;

signing said second public key using said first private key;

determining if a certification request from a customer was received within the second time interval;

if the certification request from the customer was received within the second time interval, processing the certification request from the customer during said second time interval using said second private key; and deleting said first and second private keys.

53. A machine having a memory that contains data representing certificates, said certificates generated for a customer by the following method:

creating a first public key during a first time interval and a second public key during a second time interval;

signing said second public key with a first private key created during said first time interval;

determining if a certification request was received from a customer within the second time interval;

if the certification request was received from a customer within the second time interval, creating a signature using a second private key and said data, said second private key created during said second time interval; and returning said second public key and said signature in a certificate to said customer.

54. A machine having a memory that contains data representing certificates, said certificates being authenticated by the following method:

accessing an archive, said archive including a first public key created during a first time interval and a second public key created during a second time interval, wherein said second public key is signed with a first private key created during said first time interval;

determining if a certification request was received within the second time interval;

if the certification request was received within the first time interval, receiving a certificate, said certificate containing a signature, said signature created using a second private key, said second private key created during said second time interval, said certificate further containing said second public key;

authenticating said second public key using said first public key; and authenticating said signature using said second public key.

55. A propagated signal comprising:

a first component representing a public key, said public key signed by a private key, said private key created in a first time interval, said public key created in a second time interval, said first time interval distinct from said first time interval;

a second component representing a digital signature, said signature created during said second time interval if it is determined the certification request was received within the second time interval; and wherein said signature is created using a second private key, said second private key created during said second time interval.

56. A user interface located at a user device allowing a user to receive a certificate comprising:

an input mechanism for receiving a certificate, said input mechanism accessing an archive, said archive including a first public key created during a first time interval and a second public key created during a second time interval, wherein said second public key is signed with a first private key created during said first time interval, said certificate containing a signature if it is determined the certification request was received within the second time interval, said signature created using a second private key, said second private key created during said second time interval, said certificate further containing said second public key;

authentication means for authenticating said second public key and said signature; and an output mechanism for showing the results of authenticating said second public key using said first public key and the results of authenticating said signature using said second public key to said user.

57. A method for facilitating the sale of certified data to a customer comprising the steps of:

creating a first public key during a first time interval and a second public key during a second time interval;

signing said second public key with a first private key created during said first time interval;

receiving a request to certify data from said customer;

determining if request to certify data from said customer was received within the second time interval;

if the request to certify data from said customer was received within the second time interval, creating a signature using a second private key and said data, said second private key created during said second time interval;

returning said second public key and said signature to said customer in a certificate; and charging said customer a fee.

58. A method for facilitating the sale of the authentication of data by a customer comprising the steps of:

accessing an archive, said archive including a first public key created during a first time interval and a second public key created during a second time interval, wherein said second public key is signed with a first private key created during said first time interval;

determining if a certification request was received from a customer within the second time interval;

if the certification request was received from a customer within the first time interval, receiving a certificate, said certificate containing a signature, said signature created using a second private key, said second private key created during said second time interval, said certificate further containing said second public key;

authenticating said second public key using said first public key;

authenticating said signature using said second public key; and charging said customer a fee.

59. A customer device for authenticating data comprising:

means for accessing an archive, said archive including a first public key created during a first time interval and a second public key created during a second time interval, wherein said second public key is signed with a first private key created during said first time interval;

determination means for determining if a certification request was received within the second time interval;

reception means for receiving a certificate if the certification request was received within the second time interval, said certificate containing a signature, said signature created using a second private key, said second private key created during said second time interval, said certificate further containing said second public key;

means for authenticating said second public key using said first public key; and means for authenticating said signature using said second public key.

60. A method for a customer to certify data comprising the steps of:

generating a request to certify data;

sending said request to a server;

accessing an archive, said archive including a first public key created during a first time interval and a second public key created during a second time interval, wherein said second public key is signed with a first private key created during said first time interval;

determining if a certification request was received within the second time interval;

if the certification request was received within the second time interval, receiving a certificate, in response to said request, said certificate containing a signature, said signature created using a second private key, said second private key created during said second time interval, said certificate further containing said second public key;

authenticating said second public key using said first public key; and authenticating said signature using said second public key.

* * * * *

UNITED STATES PATENT AND TRADEMARK OFFICE
CERTIFICATE OF CORRECTION

PATENT NO. : 6,381,696 B1 Page 1 of 1
DATED : April 30, 2002
INVENTOR(S) : Michael D. Doyle It is certified that error appears in the above-identified patent and that said Letters Patent is hereby corrected as shown below:

<u>Title page,</u>
Item [22], Filed: Sept. 22, 1998, please insert:
-- Related U.S. Application Data
[60]   Provisional Application No. 60/059,455, filed September 22, 1997. --

<u>Column 1,</u>
Line 3, please insert the following:
-- CROSS REFERENCE TO RELATED APPLICATION
This patent claims the priority benefit of U.S. Provisonal Application No. 60/059,455, filed September 22, 1997. --

Signed and Sealed this

Eighth Day of October, 2002

*Attest:*

*Attesting Officer*

JAMES E. ROGAN
*Director of the United States Patent and Trademark Office*

UNITED STATES PATENT AND TRADEMARK OFFICE
CERTIFICATE OF CORRECTION

PATENT NO. : 6,381,696 B1
DATED : April 30, 2002
INVENTOR(S) : Yoshihiko Imamura It is certified that error appears in the above-identified patent and that said Letters Patent is hereby corrected as shown below:

Column 12,
Line 14, "and" should read -- an --.

Signed and Sealed this

Eighth Day of July, 2003

JAMES E. ROGAN
*Director of the United States Patent and Trademark Office*

UNITED STATES PATENT AND TRADEMARK OFFICE
CERTIFICATE OF CORRECTION

| | | |
|---|---|---|
| PATENT NO. | : 6,381,696 B1 | Page 1 of 1 |
| DATED | : April 30, 2002 | |
| INVENTOR(S) | : Michael D. Doyle | |

It is certified that error appears in the above-identified patent and that said Letters Patent is hereby corrected as shown below:

This certificate supersedes Certificate of Correction issued July 8, 2003, the number was erroneously mentioned and should be vacated since no Certificate of Correction was granted.

Signed and Sealed this

Twenty-eighth Day of June, 2005

JON W. DUDAS
*Director of the United States Patent and Trademark Office*

UNITED STATES PATENT AND TRADEMARK OFFICE
CERTIFICATE OF CORRECTION

PATENT NO. : 6,381,696 B1  
DATED : April 30, 2002  
INVENTOR(S) : Michael D. Doyle It is certified that error appears in the above-identified patent and that said Letters Patent is hereby corrected as shown below:

Delete Drawing Sheet 3 of 4 and substitute the attached drawing sheet 3 of 4.

Column 7,  
Line 21, delete "memory" and insert -- cpu --.  
Line 25, delete "memory 3016" and insert -- cpu 3016 --.

Column 11,  
Line 29, should read -- The system according to claim 15 --.  
Line 55, should read -- The system according to claim 17 --.

Signed and Sealed this

Thirtieth Day of May, 2006

JON W. DUDAS  
*Director of the United States Patent and Trademark Office*